United States Patent
Andorko et al.

(10) Patent No.: US 10,880,742 B2
(45) Date of Patent: Dec. 29, 2020

(54) IRIS RECOGNITION WORKFLOW

(71) Applicant: FotoNation Limited, Galway (IE)

(72) Inventors: Istvan Andorko, Galway (IE);
Alexandru Drimbarean, Galway (IE)

(73) Assignee: FotoNation Limited, Galway (IE)

( * ) Notice: Subject to any disclaimer, the term of this patent is extended or adjusted under 35 U.S.C. 154(b) by 306 days.

(21) Appl. No.: 15/811,494

(22) Filed: Nov. 13, 2017

(65) Prior Publication Data

US 2018/0173951 A1  Jun. 21, 2018

Related U.S. Application Data

(60) Provisional application No. 62/434,701, filed on Dec. 15, 2016.

(51) Int. Cl.
*G06K 9/00* (2006.01)
*H04W 12/06* (2009.01)
(Continued)

(52) U.S. Cl.
CPC ........... *H04W 12/06* (2013.01); *G06F 21/32* (2013.01); *G06K 9/00604* (2013.01);
(Continued)

(58) Field of Classification Search
CPC ... G06F 3/013; G06F 21/32; G06Q 20/40145; G06Q 10/00; G06K 9/00604; G06K 9/00597; G06T 7/73
See application file for complete search history.

(56) References Cited

U.S. PATENT DOCUMENTS 5,291,560 A * 3/1994 Daugman ............ A61B 5/1171
382/117
8,942,434 B1 * 1/2015 Karakotsios ....... G06K 9/00597
345/619

(Continued)

OTHER PUBLICATIONS

Poursaberi et al., Iris Recognition for Partially Occluded Images: Methodology and Sensitivity Analysis, 2007, EURASIP Journal on Advances in Signal Processing vol. 2007, Article ID 36751, pp. 1-12.*

(Continued)

*Primary Examiner* — Guillermo M Rivera-Martinez
(74) *Attorney, Agent, or Firm* — Lee & Hayes, PC

(57) ABSTRACT

In an embodiment, a method comprises determining, by a portable device, image capturing conditions by analyzing contents of a particular digital image of one or more first digital images captured by one or more image capturing devices. It is also determined whether the image capturing conditions indicate indoor image capturing conditions. If the image capturing conditions indicate indoor image capturing conditions, then it is determined whether the particular digital image includes a depiction of at least one eye. If so, an iris region, depicting the at least one eye, is segmented in the particular digital image. If the segmented iris region does not include iris valid information, then one or more image capturing devices capture one or more second digital images having an enhanced contrast. If the one or more second digital images include iris valid information, then iris code is extracted from the one or more second digital images.

17 Claims, 8 Drawing Sheets

(51) Int. Cl.
*G06T 7/11* (2017.01)
*G06T 7/73* (2017.01)
*G06T 5/00* (2006.01)
*G06F 21/32* (2013.01)
*H04L 29/06* (2006.01)
*G06K 9/03* (2006.01)

(52) U.S. Cl.
CPC ..... *G06K 9/00617* (2013.01); *G06K 9/00926* (2013.01); *G06K 9/036* (2013.01); *G06T 5/007* (2013.01); *G06T 7/11* (2017.01); *G06T 7/73* (2017.01); *H04L 63/0861* (2013.01); *G06K 9/00684* (2013.01); *G06T 2207/30201* (2013.01)

(56) References Cited

U.S. PATENT DOCUMENTS

| | | | | |
|---|---|---|---|---|
| 2003/0152252 A1* | 8/2003 | Kondo | ........... | G06K 9/00597 382/117 |
| 2005/0270386 A1* | 12/2005 | Saitoh | ........... | G06K 9/00604 348/239 |
| 2006/0098097 A1* | 5/2006 | Wach | ........... | G02B 27/0025 348/207.99 |
| 2010/0277618 A1* | 11/2010 | Hiratsuka | ........... | H04N 1/32112 348/239 |
| 2011/0150334 A1* | 6/2011 | Du | ........... | G06K 9/00604 382/173 |
| 2012/0212597 A1* | 8/2012 | Hanna | ........... | H04N 7/18 348/78 |
| 2012/0249810 A1* | 10/2012 | Sato | ........... | H04N 5/23212 348/207.99 |
| 2015/0254508 A1* | 9/2015 | Kimura | ........... | G06K 9/00604 382/117 |
| 2015/0304535 A1* | 10/2015 | Smits | ........... | G06K 9/228 348/78 |
| 2016/0012218 A1* | 1/2016 | Perna | ........... | G06F 16/5838 726/18 |
| 2016/0117544 A1* | 4/2016 | Hoyos | ........... | H04N 5/23219 348/78 |
| 2017/0109511 A1* | 4/2017 | Dass | ........... | G06K 9/00926 |
| 2017/0118403 A1* | 4/2017 | Chu | ........... | G03B 7/08 |
| 2017/0124393 A1* | 5/2017 | Kim | ........... | G04G 21/00 |
| 2017/0161550 A1* | 6/2017 | Ranganath | ........... | G06K 9/00288 |
| 2017/0316266 A1* | 11/2017 | Kawabata | ........... | G06K 9/00617 |

OTHER PUBLICATIONS

Lu et al., A Symbian Based Mobile User Authorization System Using Mobile Networks, 2010, IEEE Wireless Advanced 2010, pp. 1-5.*

Lu et al., Iris Recognition on Low Computational Power Mobile Devices, 2011, Biometrics—Unique and Diverse Applications in Nature, Science, and Technology, pp. 107-128.*

* cited by examiner

IRIS RECOGNITION WORKFLOW

FIELD

The technical field of the present disclosure includes computer systems useful in wireless communications. The disclosure is also in the technical field of portable computer systems that are programmed or configured to recognize iris-based-biometrics for identification and authentication purposes.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Portable devices are widely used in many types of wireless networks, and therefore authenticating users to the portable devices plays a critical role in preventing misuse and abuse of the devices.

Several authentication methods for authenticating users to portable devices have been developed. However, accuracy of many of the methods can easily be compromised, and cost of many of them may be high. Furthermore, many of them are unreliable due to various factors, including environmental and user-specific factors.

DETAILED DESCRIPTION

In the following description, for the purposes of explanation, numerous specific details are set forth in order to provide a thorough understanding of the embodiments. It will be apparent, however, that the embodiments may be practiced without these specific details. In other instances, well-known structures and devices are shown in block diagram form in order to avoid unnecessarily obscuring embodiments.

General Overview

In an embodiment, iris recognition solutions and workflows for portable devices are presented. The presented approaches allow integrating processes configured to recognize depictions of human irises in digital images, with processes configured to generate iris codes from the iris depictions, and processes configured to use the iris codes for authentication purposes.

Techniques described herein may be implemented in a variety of portable consumer devices, such as cellular phones, smartphones, tablets, smartwatches, PDAs, and the like. The presented techniques may be used to configure for example, a smartphone to generate and store an iris biometric template for a user, obtain iris code from a digital image depicting the user, and authenticate the user to the smartphone based on the iris code and the iris biometric template.

In an embodiment, the techniques are implemented in portable devices that are equipped with one or more cameras. Examples of the cameras include near-infra-red (NIR) cameras, Red-Green-Blue (RGB) cameras, and hybrid cameras comprising one or more NIR cameras and one or more RGB cameras. Unless specified otherwise, the cameras described herein are NIR cameras.

In an embodiment, the techniques are implemented in portable devices that are equipped with one or more light emitting diodes (LED) that are configured to emit light when activated. Examples of LEDs include one-color flashing LEDs and multi-color flashing LEDs.

Figure 1:
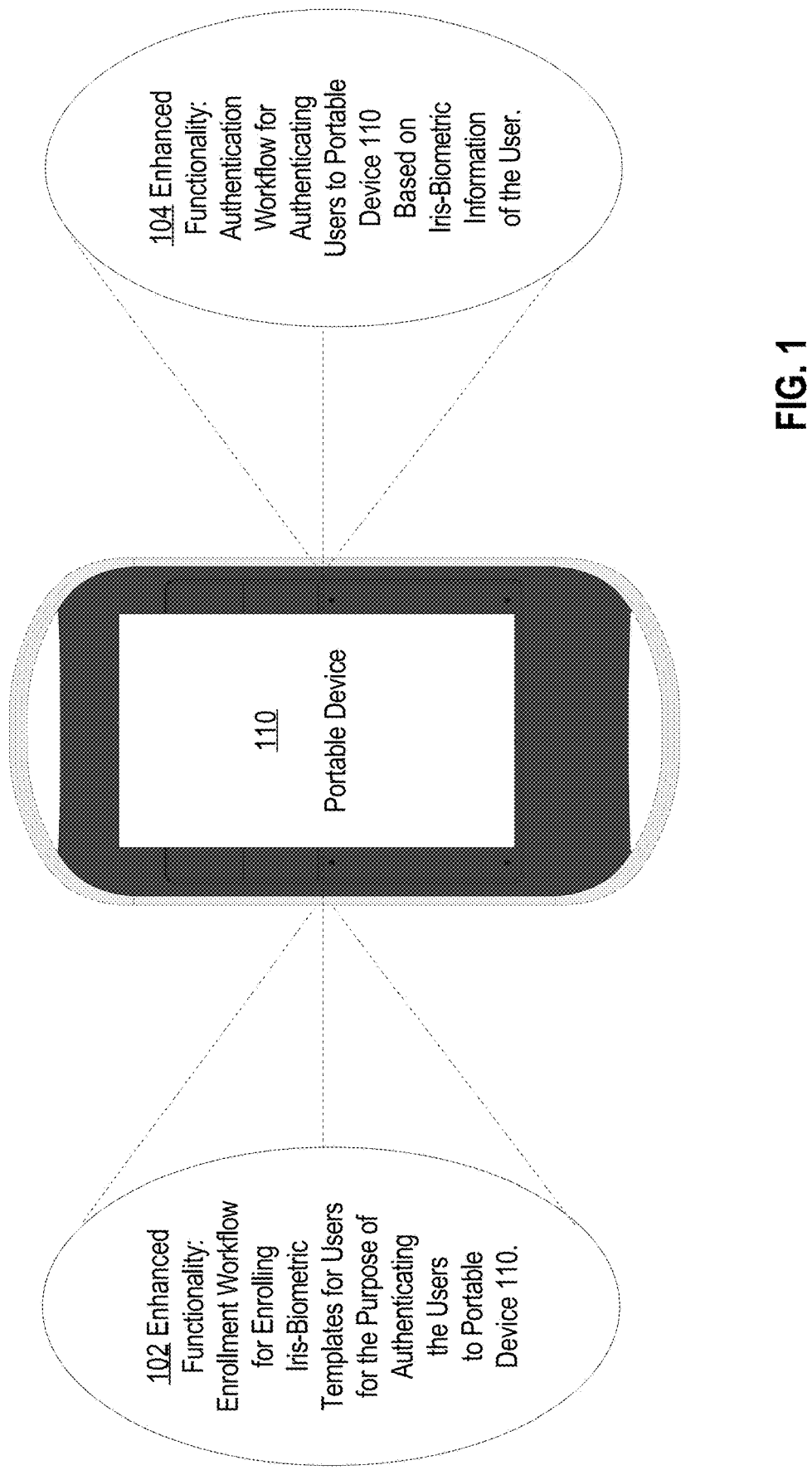
FIG. 1 is a block diagram depicting an example iris recognition system implemented in a portable device in accordance with one or more embodiments.

FIG. 1 is a block diagram depicting an example iris recognition system implemented in a portable device in accordance with one or more embodiments. Portable device 110 may be any type of mobile device, including a smartphone, a tablet, a smartwatch, a PDA, and the like.

In an embodiment, the iris recognition system is implemented in a portable device 110 to enhance functionalities of portable device 110. The iris recognition functionalities implemented in portable device 110 to enhance the functionalities of portable device 110 comprise an enhanced functionality 102. Enhanced functionality 102 allows generating iris-biometric templates for users and enrolling the generated iris-biometric templates for the purpose of authenticating the users to portable device 110. Enhanced functionality 102 enhances the functionalities of portable device 110 by configuring portable device 110 to generate and process iris-biometric templates of users and to store the iris-biometric templates to be later used to authenticate the users to portable device 110.

In an embodiment, the iris recognition functionalities implemented in portable device 110 to enhance functionalities of portable device 110 comprise an enhanced functionality 104. Enhanced functionality 104 allows authenticating users to portable device 110 based on iris-biometric information received from the users and iris-biometric templates previously stored for the users. Enhanced functionality 104 enhances the functionalities of portable device 110 by configuring portable device 110 to authenticate users to portable device 110 based on iris-biometric information obtained from the users and the iris-biometric templates previously stored for the users.

In an embodiment, the techniques comprise a fine-tuning of one or more image capturing settings implemented in a portable device. Image capturing settings are the settings that the portable device uses to capture images. The settings may include the settings used to control cameras and LEDs that are implemented in the portable device. The settings may be adjusted to increase the quality of the captured digital images, and therefore to increase the likelihood that iris-biometric information derived from the captured images is adequate.

In an embodiment, the techniques allow enhancing contrast of the images captured by a portable device. Contrast adjustment is desirable to facilitate an iris recognition in captured images regardless of the color of the depicted iris. Since the colors of the irises in people vary from quite dark to quite light, the contrast enhancement allows generating iris templates for the irises depicted in the captured images regardless of the color of the iris.

Portable Device Executing Enrollment and Authentication Workflows

Figure 2:
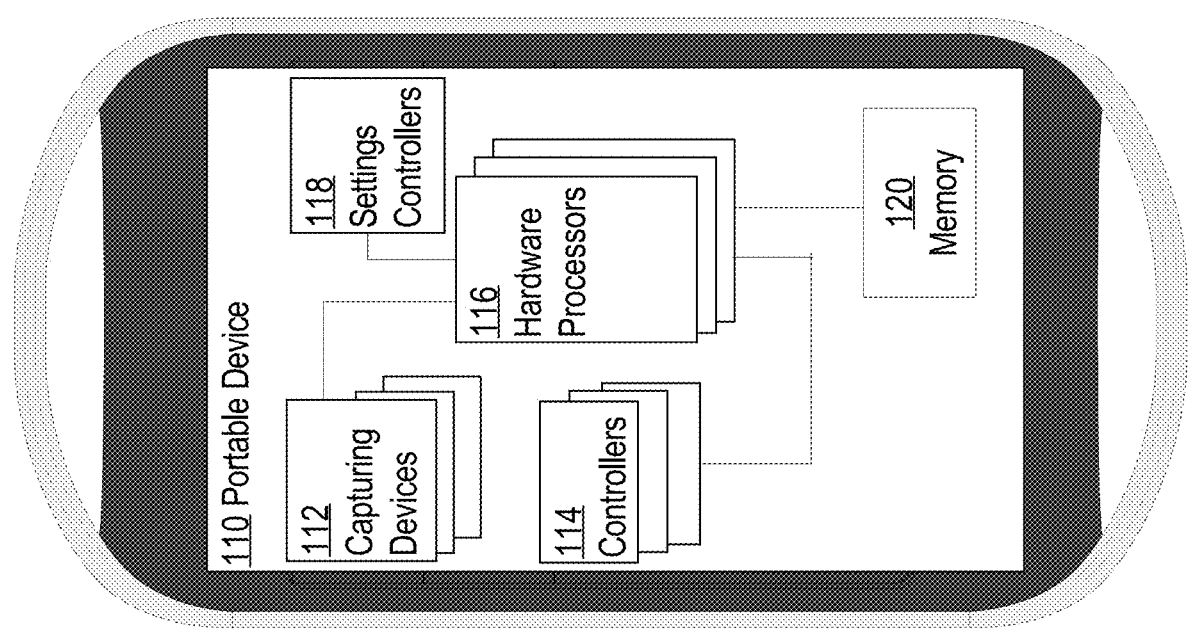
FIG. 2 is a block diagram depicting an example iris recognition system implemented in a portable device in accordance with one or more embodiments.

FIG. 2 is a block diagram depicting an example iris recognition system implemented in a portable device in accordance with one or more embodiments. In an embodiment, portable device 110 is configured with enhanced functionalities implementing the iris recognition approach. The enhanced functionalities comprise the functionality to generate and enroll iris-biometric templates for users for the purpose of authenticating the users to portable device 110, and the functionality to authenticate the users to portable device 110 based on iris codes generated from depictions of the users and the iris-biometric templates stored for the users.

In an embodiment, an iris recognition system implemented in portable device 110 comprises one or more memory units 120 storing programmable instructions, one or more image capturing devices 112, one or more hardware processors 116, one or more settings controllers 118, and one or more other controllers 114. Hardware processors 116 may be configured to execute the programmable instructions. Settings controllers 118 may be configured to set, adjust, and/or recent settings on image capturing device 112. Controllers 114 may be configured to perform object detections on captured images, manage an iris code template enrollment process, manage an iris code based authentication process, and manage various test performed by the processes.

In an embodiment, executing the instructions causes hardware processors 116 to receive one or more first digital images captured by the one or more image capturing devices. A particular digital image, of the one or more first digital images, is analyzed to determine image capturing conditions.

Image capturing conditions are weather and/or surrounding conditions surrounding the portable device at the time the first digital images are captured. The image capturing conditions may include one or more of: a condition with clouds, a condition with sun, a condition with a strong sun, a condition with a rain, a condition with a sun rise, a condition with a sun sunset, a condition in a dark room, a condition in a bright room, a condition with a natural light, a condition with a fluorescent light, or a condition with a dimmed light.

In an embodiment, the image capturing conditions are analyzed to determine whether the image capturing conditions indicate indoor image capturing conditions.

In response to determining that the image capturing conditions indicate indoor image capturing conditions, it is determined whether the particular digital image includes a depiction of at least one eye. In response to determining that the particular digital image includes a depiction of at least one eye, the particular digital image is segmented to identify an iris region that depicts the at least one eye.

In an embodiment, it is determined whether the iris region includes iris valid information. If the iris region does not include iris valid information, then instructions are generated and sent to the one or more image capturing devices to cause the image capturing devices to capture one or more second digital images having an enhanced contrast. Alternatively, if the iris region does not include iris valid information, the contrast of the particular digital image is digitally enhanced, and the segmenting of the iris region is repeated for the enhanced particular digital image.

In an embodiment, it is determined whether the one or more second digital images include iris valid information. If the one or more second digital images include iris valid information, then iris code is extracted from the one or more second digital images.

In response to determining that the one or more second digital images include iris valid information, it is determined whether an enrollment request is received to use the iris code as an enrollment template. If such an enrollment request is received, then a user identifier is generated and associated with the iris code, and the iris code is stored in the memory as an iris template in association with the user identifier.

In response to determining that the one or more second digital images include iris valid information, it is determined whether an authentication request is received to use the iris code as an authentication attempt. If such an authentication request is received, then one or more iris templates are retrieved from a storage device and compared with the iris code to determine whether the iris code matches any iris template of the one or more iris templates.

In an embodiment, in response to determining that the iris code matches a particular iris template, of the one or more iris templates, access to the portable device is granted. However, if the iris code does not match any iris template, of the one or more iris templates, then access to the portable device is denied.

In an embodiment, in response to determining that the image capturing conditions, determined for the particular digital image, do not indicate indoor image capturing conditions, one or more adjustments are determined for one or more image capturing settings. The one or more adjustments are used to adjust the one or more image capturing settings of the one or more image capturing devices. Furthermore, instructions are generated and sent to the one or more image capturing devices to cause them to capture one or more third digital images. The captured third digital images are processed and it is determined whether an authentication request is received. If an authentication request is received, then it is determined, based on the one or more third digital images, whether to grant or deny access to the portable device.

In an embodiment, in response to determining that the particular digital image includes a depiction of two eyes, two iris regions depicting the two eyes are identified in the particular digital image. Based on the two iris regions, a subject distance is computed. The subject distance represents a distance between a user and the portable device.

In an embodiment, based on the subject distance, it is determined whether the subject distance is acceptable for extracting at least one iris code from the two iris regions. If the subject distance is acceptable for extracting at least one iris code from any of the two iris regions, then at least one iris code is extracted from the iris regions. However, if the subject distance is not acceptable for extracting iris code from the iris regions, then a contrast enhancement is performed on the particular digital image.

In an embodiment, in response to determining that the iris region does not include iris valid information, it is determined whether one or more counters satisfy one or more criteria. The one or more counters store counts of frames which did not include iris valid information. If the counters satisfy the one or more criteria, then it is determined whether to perform a contrast enhancement on the particular digital image, and if so, the contrast enhancement is performed on the particular digital image.

Iris Recognition Workflow

In an embodiment, an iris recognition system is implemented in a portable device as enhanced functionalities of the portable device. The enhanced functionalities comprise the functionality to generate and enroll iris-biometric templates for users for the purpose of authenticating the users to the portable device. The enhanced functionalities also comprise the functionality to authenticate the users to the portable device based on iris codes generated from depictions of the users and the iris-biometric templates stored for the users.

Capturing Digital Images

Figure 3:
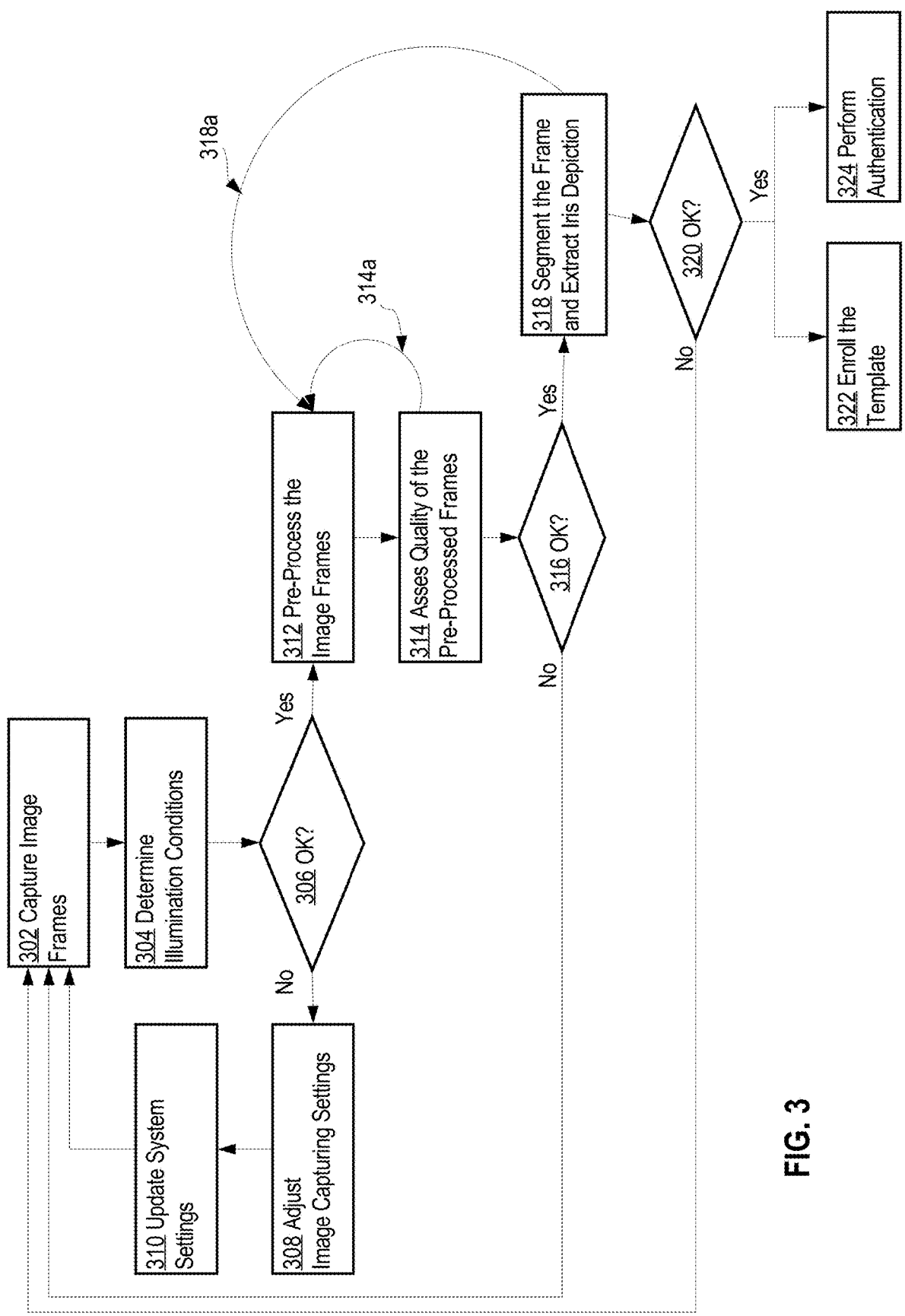
FIG. 3 is a block diagram depicting an example iris recognition workflow in accordance with one or more embodiments.

FIG. 3 is a block diagram depicting an example iris recognition workflow in accordance with one or more embodiments. In step 302, one or more digital images are captured by a portable device. The digital images are also referred to as image frames, or just frames. The frames may be captured using one or more image capturing devices implemented in the portable device. The image capturing devices may include cameras equipped with image sensors. The cameras may include NIR cameras and/or RGB cameras.

In an embodiment, a portable device is equipped with at least one NIR camera that is used to capture NIR images. The portable device may also be equipped with RGB cameras configured to capture RGB images.

In an embodiment, the frames are captured using image sensors configured using standard settings. The standard settings may include default settings configured by a manufacturer of the portable device. The standard settings may also be the customer settings that a user configured on the portable device. The captured frames may be saved in any type of memory unit or device that is maintained by and accessible to the portable device.

Determining Illumination Condition

In step 304, based on contents of the captured image frames, illumination conditions depicted in the frames are determined. This may be accomplished by analyzing the content of the frames to determine whether the frames were captured indoors or outdoors. Examples of indoor illumination conditions may include well-lit indoors, normally-lit indoors, and dark-lit indoors. Examples of outdoor illumination conditions may include outdoor illumination conditions specific to a cloudy day, a sunny day, a very sunny day, a rainy day, and so forth.

In an embodiment, captured image frames are analyzed to determine one or more illumination characteristics. For example, a color value histogram may be determined for the captured images, and the presence or absence of certain color values in the histogram may be used to determine whether the images were captured indoors or outdoors. According to another example, a color intensity histogram may be determined for the captured images, and the presence or absence of certain intensity values in the histogram may be used to determine whether the image were captured indoors or outdoors.

Other methods for determining illumination conditions for the images may be based on a brightness analysis of the images, a spectral analysis, a gradient analysis, and the like. For example, the outdoor images are usually brighter than the indoor images. Therefore, the images that have brightness values exceeding a certain threshold may indicate outdoor images. The analysis may be performed on a pixel basis or a pixel-group basis.

While it is possible to identify and determine many different types of illumination conditions, three different illumination conditions are usually considered and paired with the captured images. The three different illumination conditions include indoor illumination conditions, outdoor illumination with clouds, and outdoor illumination with the strong sun. Other embodiments may include other types of illumination conditions.

Adjusting Image Capturing Settings

In step 306, a test is performed to determine whether one or more image capturing settings on the portable device are acceptable or need to be adjusted to improve the quality of images. The image capturing setting may need to be adjusted if the captured images appear to be overexposed or underexposed, if the images appear to be too dark or too light, if certain regions of the images appear to be too dark or too light, and so forth. For example, the settings for images captured outdoors are usually different than settings for an image exposure for images captures indoors. The settings may include exposure compensation settings, flash settings, settings for a focal length, focus distance settings, white balance settings, color effect settings, and zoom settings. Usually, the image capturing settings are rarely adjusted for images captured indoors. However, the image capturing settings are usually adjusted for images captured outdoors.

If the image capturing settings need to be adjusted, then step 308 is performed. Otherwise, step 312 is performed.

In step 308, the image capturing settings are adjusted on the portable device. The image acquiring settings that may be adjusted may include an image sensor power and/or a light emitting diode (LED) power. This may also include extending or shortening the exposure time, and modifying other camera-specific parameters.

If the images were captured indoors, then the image capturing settings may not need be adjusted. For example, for the purpose of enrolling an iris template into the iris recognition system, images captured indoors are preferred. In fact, in some cases, only images that were captured indoors may be used to generate iris templates for the enrollment purposes. However, if the images captured outdoors, then the image capturing settings are typically adjusted.

In step 310, the system settings of the portable device are updated using the adjusted image capturing settings determined in step 308. This may include accepting the adjusted image capturing settings on the portable device, or indicating that adjusting the image capturing settings has been completed. The updating is performed automatically by the processes executed on the portable device, and do not involve any action on the part of user of the device.

Capturing Additional Digital Images

If the processing has been redirected to step 302n, then in that step a new set of images is captured. The new set of is then processed in step 304, similarly to the processing described above. In step 306, the test described above is performed on illumination conditions determined for the new set of images, and then either step 312 or step 308 is performed.

Pre-Processing the Digital Images

In step 312, the captured images are pre-processed. In an embodiment, the images are pre-processed based on information obtained from an image quality assessment process and/or an image segmentation and extraction process. The pre-processing may be performed on a subset of the images or on all the images. For example, a particular image frame may be selected from the provided images as representative of the provided images, and the particular image may be pre-processed.

Pre-processing of an image may include a contrast enhancement using predefined values, a contrast enhancements using information from the image, and a gamma correction. Other types of pre-processing may also be included. Depending on implementation, the image may be processed by only one type of pre-processing, by any two types of pre-processing, or by all types of processing.

In an embodiment, an image pre-processing includes a contrast enhancement using predefined values. This may include determining one or more contrast values for the image, and comparing the contrast values with a pre-defined value range. If the contrast values do not fall within the range, then the contrast of the image may be modified.

In an embodiment, an image pre-processing includes a contrast enhancement performed using information extracted from the image. This may include lightening the areas in the image that are already light, and darkening the areas in the image that are already dark.

In an embodiment, an image pre-processing includes a gamma correction. Gamma correction of an image allows correcting a luminance component of the pixel information represented in the captured image. Gamma correction is often performed to correct or compensate for non-linear characteristics of the image sensors used to capture the image. Since the image capturing sensors may have unique non-linear characteristics for capturing luminance information of the image, the gamma correction is used to adjust the luminance information for the pixels of the image to conform them as much as possible to a linear distribution. The adjustment is usually performed by applying a gamma correction function that maps non-linear luminance levels of the pixels in the image to linear luminance levels for the pixels.

Assessment of the Image Quality

In step 314, a test is performed to determine whether the one or more pre-processed images are suitable for the iris recognition purposes. This may include assessing the quality of the pre-processed images using one or more image quality metrics. The image quality metrics may include a focus (sharpness) metric, a contrast metric, and a pixel density metric. The metrics may be defined as metrics of constant values or thresholds, and may be used to test whether values associated with the pixels or groups of pixels of the images match the constant values or the thresholds included in the metrics.

An image quality assessment of a pre-processed image for the iris recognition purposes may include determining whether the pre-processed image meets the requirements set forth in the focus/sharpness metric. This may include determining gradient values for groups of pixels, using the gradient values to determine edges depicted in the image, using the information about the edges to determine a count of the depicted edges, and then determining whether the count of the depicted edges exceeds a certain threshold. Usually, the higher count of edges depicted in the image is, the sharper the image is.

An image quality assessment of a pre-processed image for the iris recognition purposes may include determining whether the pre-processed image meets the requirements set forth in the contrast metric. This may include determining a range for the values for the pixels and determining whether the range exceeds a certain threshold. Usually, the higher the range is, the higher contrast is.

An image quality assessment of a pre-processed image for the iris recognition purposes may include determining whether the pre-processed image meets the requirements set forth in the pixel density metric. An outcome of the test may depend on the distance between the subject who is depicted in the image and the camera that was used to capture the image.

In an embodiment, if assessing the quality of the pre-processed images is difficult or inconclusive, the processing may be redirected to step 312, as depicted using an arrow 314a. Redirecting the processing back to step 312 may allow repeating the pre-processing of the pre-processed image, and this may lead to enhancing the captured images. This in turn may lead to selecting a different subset of the captured images as pre-processed images. Steps 312 and 314 may be repeated a certain number of times before the process proceeds to step 316.

In step 316, a test is performed to determine whether one or more pre-processed images have acceptable image quality for the purposes of an iris recognition. This may include determining whether the quality of the image assessed in step 314 meets one or more certain thresholds. This may include performing one or more of: a focus test, a contrast test, or a pixel density test. This does not require, however, that all the tests are preformed, or that only one or two tests are performed. Instead, any combination of the above listed tests may be implemented as part of the iris recognition workflow.

A focus test may include determining whether a count of edges identified in the image exceeds a certain count threshold. A contrast test may include determining whether a range of pixel values determined for the image exceeds a certain range threshold. A pixel density test may include determining whether the pixel density determined for the image exceed a certain density threshold.

If it is determined in step 316 that the quality of one or more pre-processed images is acceptable for the purposes of an iris recognition, then step 318 is performed. Otherwise, step 302 is performed to capture new images.

Segmenting an Iris Region and Extracting Iris Code

In step 318, one or more pre-processed images that have a sufficient image quality are subjected to a further processing. In this step, one or more eye detectors or classifiers may be applied to a pre-processed image to determine whether the image depicts at least one eye. If an eye is depicted in the image, then the image is further processed to identify an iris region that includes a depiction of the eye. The iris region may be segmented and iris information associated with the depiction of the iris may be extracted.

Segmentation is a type of image processing that allows identifying an iris region in an image. This may include determining an iris contour, shape and pattern. This may also include determining a spatial relationship between the iris and the eyelids neighboring the iris. Once the iris region and the iris' properties have been segmented, the information about the iris may be extracted from the iris region. The extracted information may include various characteristics of the depicted iris. The characteristics may include a pattern, size, location, orientation, shape, color, shade, spatial relation between the iris and the eyelids neighboring the iris, and other information that may be obtained for the group of pixels that collectively form the depiction of the iris. The segmentation of the iris region and extraction of the iris information from the iris region may be performed on each of the pre-processed images separately or in parallel.

In an embodiment, if segmenting an iris in a pre-processed image is difficult or inconclusive, then the processing may be redirected to step 312, as depicted in FIG. 3 using an arrow 318a.

Segmentation of an iris may be inconclusive when the segmented information does not meet certain criteria. Such criteria may include testing whether the segmented iris information indicates a round iris. Typically, a human iris has a round shape; therefore, the segmented iris information is expected to indicate a round shape of the iris. The criteria may also include testing whether the segmented iris information indicates a round pupil since typically, the human pupil has a round shape. Furthermore, the criteria may include testing whether the segmented iris information indicates that there is a contrast between the pupil area and the iris area or the sclera area, as the pupil is expected to be darker than the iris and/or the sclera. Moreover, the criteria may include testing whether the segmented iris information indicates that there is a contrast between the iris area and the sclera area, as the iris is expected to be darker than the sclera.

Redirecting the processing back to step 312 may allow repeating the pre-processing of the captured images. The repeated pre-processing may lead to enhancing the captured images. That in turn may lead to selecting a different subset of pre-processed images from the captured images. Steps 312 and 314 may be repeated a number of times before the process proceeds to step 316.

In step 320, a test is performed to determine whether information about an iris depicted in at least one pre-processed image was successfully extracted and represents meaningful iris code. This may include determining whether the iris information extracted from the pre-processed image contains a sufficient amount of data and the extracted data is valid data. The successfully extracted iris information is also referred to as an iris code.

If the extracted iris information is valid and acceptable, then the extracted iris information may be used either as an iris code template in a template enrollment step 322, or as the iris code in an authentication step 324. Otherwise, step 302 is performed and new images are captured by the portable device.

Enrolling an Iris Code Template

Step 322 is performed to enroll an iris code template to iris code templates database. In step 322, the iris information extracted from one or more pre-processed images is enrolled as an iris code template for the iris recognition purposes. The iris code template may be used as a biometric signature or a biometric template that uniquely identifies the user of the portable device.

In an embodiment, a person identifier is generated and associated with the iris code template. The identifier may be generated randomly, or based on the information provided by the user or for the user. The identifier may be for example, an alpha-numerical string, and may include a person's name and/or a last name. The iris code template and the associated identifier may be stored in a data structure maintained by, or accessible to, the portable device, and may be used as the user's biometric signature for the authentication purposes.

User Authentication Based on Iris Code

Alternatively to step 322, step 324 may be performed. In this step, the extracted iris information is used as iris code to authenticate the person to the portable device. The iris code may be matched against one or more iris code templates stored in a database maintained by, or accessible to, the portable device. If a match between the iris code and a particular iris code template stored in the database is found, then access to the portable device may be granted. However, if the iris code does not match any iris code template stored in the database, then access to the portable device may be denied.

Enrolment Workflow for Enrolling an Iris-Code Template

Generally, the process of enrolling iris code as an iris code template into an iris recognition system follows steps 302-322 described in FIG. 3; however, the process may include some additional steps that for clarity of the description of FIG. 3 have been omitted in FIG. 3. An embodiment of the process of enrolling iris code as an iris code template into an iris recognition system is described in FIG. 4A-4B.

Capturing Digital Images in an Enrollment Workflow

Figure 4A:
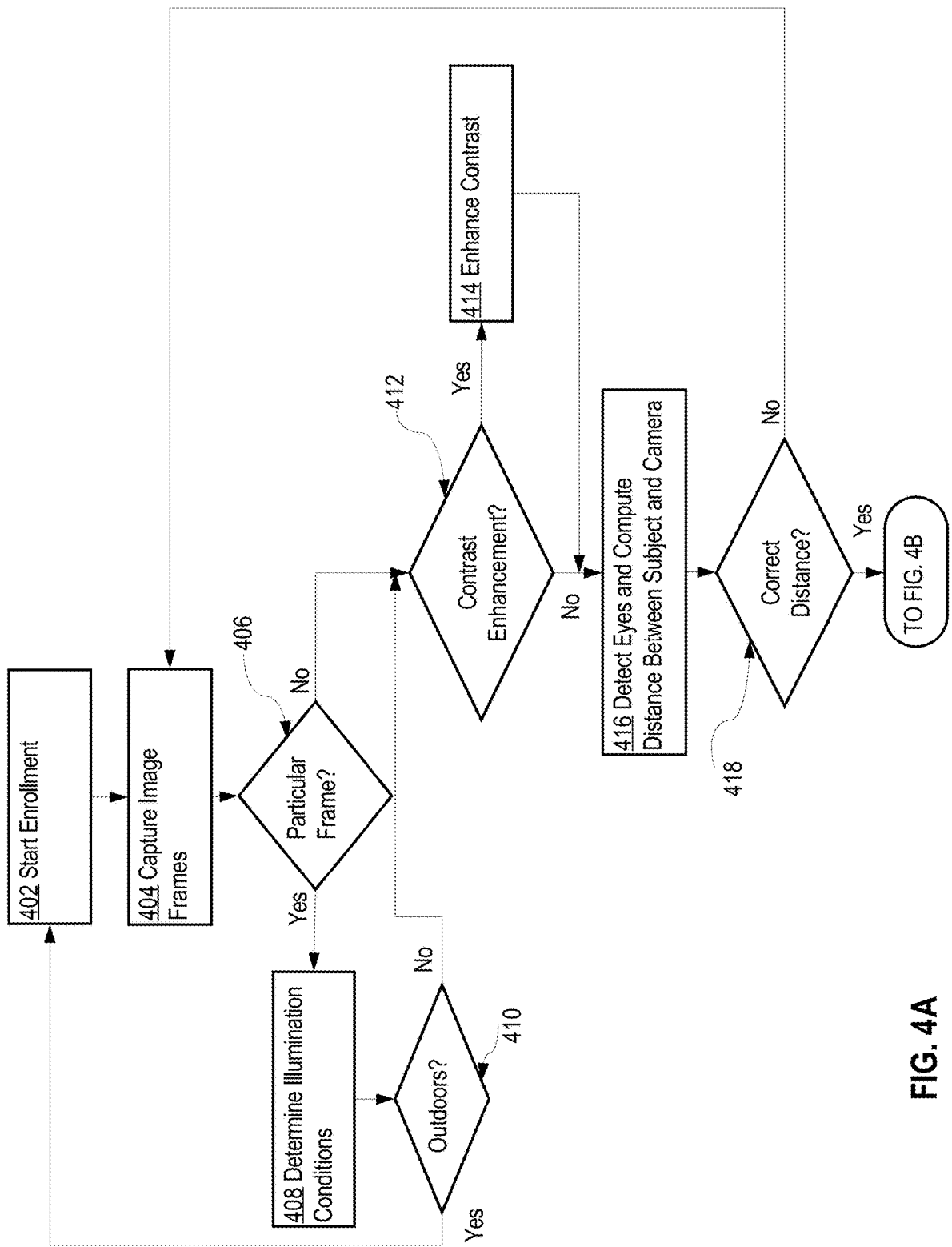
FIG. 4A is a block diagram depicting an example iris code enrollment workflow in accordance with one or more embodiments.

FIG. 4A is a block diagram depicting an example iris code enrollment workflow in accordance with one or more embodiments. In step 402, a process of enrolling iris code into an iris recognition system starts. The process may be initiated by receiving input from a user that the user wishes to start the process. The process may be initiated on any type of portable device, such as a smartphone, a laptop, a tablet, and the like. For example, a user may press a start button on a smartphone, and in response to pressing the start button, the smartphone may generate a display on a display screen of the smartphone. The display may include instructions for initiating the iris code enrollment process.

In addition, the display may provide details about the process, and outline the process for the user. For example, the display may provide details and instructions for having the pictures taken by the smartphone, and details and instructions for providing the user's identification data.

In step 404, one or more image frames are captured by the portable device. The frames may be captured using one or more image capturing devices implemented in the portable device. The image capturing devices may include a NIR camera, or any other type of cameras.

In an embodiment, one or more first frames, of the captured image frames, are ignored in further processing. The ignored frames may include a first frame, a second frame, a third frame, or any other frame, and such frames may be discarded. The first few frames may be ignored because it is assumed that they may have rather a poor quality. For example, a user may use a smartphone to take selfies which are pictures that the user takes of himself. The user may treat the first few selfies as a test, and based on the first selfies, the user may adjust the distance and the angle between the user and the smartphone. Then, he may take additional selfies until the additional selfies have a better quality than the first selfies.

In step 406, a test is performed to determine whether a particular image frame has been captured. The particular image may be a second image, a third image, or any other image that has been chosen for a particular implementation of the iris code enrollment workflow.

If in step 406 it was determined that the particular image frame has been captured, then step 408 is performed. Otherwise, step 412 is performed.

Determining Illumination Condition in an Enrollment Workflow

In step 408, one or more illumination conditions are determined for the particular image frame. This step is similar to step 304 described in FIG. 3.

In an embodiment, illumination conditions determined for the particular image frame are analyzed to determine whether the particular image frame was captured indoors or outdoors. Typically, it is recommended that the enrollment process be performed on images captured indoors, as they may provide a better quality depictions than images taken outdoors.

In step 410, based on the outcome of the analysis of the illumination conditions for the particular image frame, a test is performed to determine whether the particular image frame was captured outdoors. If it is determined that the particular image frame was captured outdoors, then step 402 is performed in which the iris code enrollment process starts anew. Furthermore, if it is determined that the particular image frame was captured outdoors, a message may be displayed for a user to indicate that the iris code enrollment process requires image frames that were captured indoors, not outdoors. In addition, a message may be displayed for the user to indicate that the enrollment process may be terminated for now, but it may be resumed once the user provides certain input or restarts the enrollment application.

Enhancing Image Contrast in an Enrollment Workflow

In step 412, a test is performed to determine whether a contrast enhancement option has been activated on the portable device. Performing contrast enhancement on an image is usually a time-consuming process, and therefore, it is usually turned off by a default. If there is a need to enhance the contrast for the image frame, then the option may be turned on either automatically or manually.

If the contrast enhancement option has been activated on the portable device, then in step 414, a contrast enhancement process is initiated on the smartphone and used to pre-process the particular image frame and/or additionally captured image frames. If the contrast enhancement option has not been activated on the portable device, then step 416 is performed.

In step 414, the particular image frame is pre-processed to enhance contrast characteristics of the particular image frame. This may include determining regions in the image that have pixel values higher than certain thresholds and increasing the respective pixel values by certain amounts. This may also include determining regions in the image that have pixel values lower than certain thresholds and decreasing the respective pixel values by certain amounts. Other approaches may also be implemented. Examples of various contrast enhancement approaches are described in step 312 of FIG. 3.

Detecting Eye Regions in an Image in an Enrollment Workflow

In step 416, the particular image frame is processed to determine one or more regions in which an eye, or eyes are depicted. Determining the eye regions in the particular image frame may include applying programmable detectors and/or classifiers to the image. The detectors and classifiers may be designed to process content of the image, compare information about the content of the image with various eye templates, and determine whether the image depicts at least one eye.

Determining a Subject Distance in an Enrollment Workflow

In an embodiment, in step 416, a test is performed to determine whether the particular image frame depicts two eyes. If the particular image frame depicts two eyes, then the information about the two eyes may be sufficient to calculate a distance between a user (a physical person) and a camera of the portable device. The distance may be calculated using any method known in the optics and trigonometrical arts. The distance between the user and the camera is also referred to as a subject distance.

In step 418, a subject distance is compared with a threshold range, and a test is performed to determine whether the subject distance is within the threshold range. If the subject distance exceeds the threshold range, then the user is probably too far from the camera, and a depiction of the user in the particular image frame may be too small to provide enough information for a successful enrollment of the iris code into the enrollment system. If the subject distance is below the threshold range, then the user is probably too close to the camera, and a depiction of the user in the particular image frame may be too large to provide enough information for a successful enrollment of the iris code into the enrollment system.

In an embodiment, instead of a threshold range, a threshold upper bound is used. If the subject distance exceeds the threshold upper bound, then the user is probably too far from the camera, and a depiction of the user in the particular image frame may be too small to provide enough information for a successful enrollment of the iris code into the enrollment system.

In an embodiment, instead of a threshold range and a threshold upper bound, a threshold lower bound is used. If the subject distance is below the threshold lower bound, then the user is probably too close from the camera, and a depiction of the user in the particular image frame may be too large to provide enough information for a successful enrollment of the iris code into the enrollment system.

Any of the method described above may be used to determine, in step 418, whether the subject distance is correct with respect to the camera location. If it is determined that the subject distance is correct, then the particular image frame is further processed as described in FIG. 4B. However, if in step 418 it is determined that the subject distance it incorrect, then step 404 is performed and additional images are captured.

Segmenting an Iris Region in an Image in an Enrollment Workflow

Figure 4B:
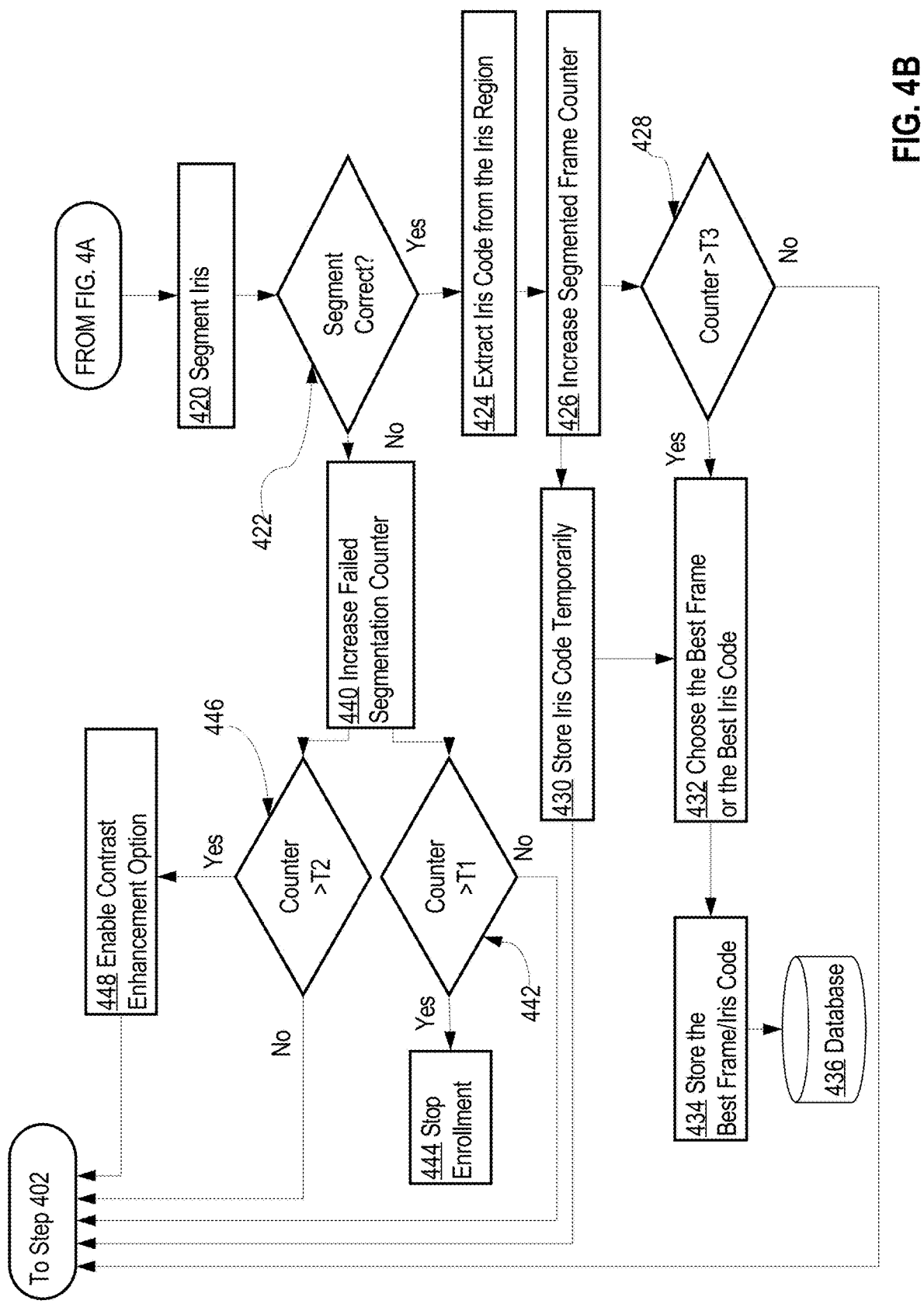
FIG. 4B is a block diagram depicting an example iris code enrollment workflow in accordance with one or more embodiments.

FIG. 4B is a block diagram depicting an example iris code enrollment workflow in accordance with one or more embodiments. Steps described in FIG. 4B are executed once it is determined that a subject distance between a user and a camera used to capture images of the user is correct. The test for determining whether the subject distance is correct are described in step 418 of FIG. 4A.

In step 420, the particular image frame is further processed to segment an iris region in the frame. Segmenting an iris region in a frame may include determining a spatial relationship between the iris and the eyelids neighboring the iris, and determining the region that is small enough to capture the depiction of the iris and large enough to capture only the depiction of the iris and not the depictions of the eyelashes or eyelids.

In an embodiment, once an iris region is segmented, one or more ISO metrics are generated. The ISO metrics may facilitate a computation of focus quality, computation of image contrast, computation of entropy and the like.

In step 422, a test is performed to determine whether the segmentation of the iris region was successful. For example, once the successful segmentation is returned by a software library, the library may determine that the boundaries of both the pupil and iris have successfully been identified.

If the segmentation was successful, then step 424 is performed. Otherwise, step 440 is performed.

Failed Segmentation Counter

In an embodiment, a failed segmentation counter is maintain by an iris code enrollment process. A failed segmentation counter is a programmable counter designed to count the occurrences of unsuccessful iris segmentations in images. The failed segmentation counter may be reset to zero each time a new enrollment session starts, and/or when it reaches a certain threshold. The counter value may be increased each time when a segmentation of the iris region in an image processed within a particular enrollment session failed. For example, the counter may be increased when, based on the test performed in step 422, it is determined that an iris segmentation in an image failed.

In step 440, the failed segmentation counter is increased because in step 422 it was determined that the segmentation of the iris region in the particular image frame has failed.

In an embodiment, an output of the failed segmentation counter is communicated to both step 442 and step 444.

In step 442, a test is performed to determine whether to stop an enrollment process. For example, if a value of the failed segmentation counter exceeds a first threshold, then the enrollment process is terminated. The value associated with the first threshold may depend on the implementation of the enrollment process. In an embodiment, the first threshold may be assigned a value from an empirically defined range.

In step 446, a test is performed to determine whether to enable a contrast enhancement option on a portable device. For example, if a value of the failed segmentation counter exceeds a particular threshold, then this may indicate that the iris segmentations have been failing because the contrast of the image, or images, is insufficient for the proper segmentation of the iris region. The value associated with the particular threshold may depend on the implementation of the enrollment process. In an embodiment, the particular threshold may be assigned a value from an empirically defined range.

A first threshold and a particular threshold may be predetermined in a variety of ways. For example, the first threshold, which is used to determine whether to terminate the enrollment process, may exceed the particular threshold, which is used to determine whether to activate a contrast enhancement option on the portable device.

In step 448, a contrast enhancement option is enabled. The contrast enhancement option may be enabled to allow the camera to either enhance contrast in the particular image frame or capture images having a better contrast than the contrast captured in the particular image frame.

In an embodiment, a contrast enhancement option is implemented in firmware of the portable device. Such an implementation increases the efficiency of the contrast enhancement implementation.

Extracting Iris Code from an Iris Region in an Enrollment Workflow

In step 424, iris code is extracted from an iris region segmented from the particular image frame. The iris code may be extracted from the iris region in many ways. Examples of different approaches for segmenting an iris code are described in step 318 of FIG. 3.

In step 426, a segmented frame counter is increased, and in step 430 the iris code extracted in step 424 is temporarily stored in a storage device.

A segmented frame counter is a counter that is used to determine whether the number of frames from which iris codes were successfully extracted is sufficient to finish the enrollment process for the user. Usually, one iris code for a user may be enough. However, if one iris code does not provide sufficient biometric information about the user to the enrollment and authentication systems, then two or more iris codes may be used as iris code templates. For example, one iris code may be extracted from an image frame that had sufficient contrast, but was captured in a rather dark room. Such iris code may be useful to authenticate the user if the user attempts to authenticate himself to the system in a dark room. However, such iris code may not be useful to authenticate the user if the user attempts to authenticate himself to the system in a bright room. Therefore, it may be desirable to collect at least two, three or even more iris codes for the user.

In step 428, the current value associated with the segmented frame counter is compared with a counter threshold. For clarity of the description, the counter threshold is also referred to as a third threshold, so that it is not confused with the thresholds described in steps 442 and 446. The third threshold may be associated with any integer value.

If the current value associated with the segmented frame counter exceeds the third threshold, then step 432 is performed. Otherwise, step 402 of FIG. 4A is performed to capture additional image frames.

Enrolling Iris Code into an Enrollment Database

In step 432, the best iris code is selected from the temporarily stored codes/frames. The best image frame may be chosen based on the ISO metrics generated at stage 420. Determining the best image frame (or iris code) may be performed based on determining which of the frames/codes satisfies one or more criteria the best. For example, the best frame/code may be the frame/code which has the lowest occlusion value. That means that the best frame/code may be the frame/code that represents an iris that is the least occluded by other objects. Other criteria may also be used in the process of selecting the best frame/code for the iris code enrollment purposed.

In step 434, the best frame/code representing the iris code is stored as an iris code template in database 436. The iris-code template may be used by the authentication process to authenticate the user to the portable device, or the resources available from the portable device.

Database 436 may be implemented in any type of storage device, such as a memory unit, or other storage. Database 436 may be used to permanently store one or more iris code templates to be used by the authentication system to authenticate the user to the portable device and/or other devices via the portable device. While one iris code template may provide sufficient biometric code to identify the user to the system, in some situations more than one iris code template may be stored for the user in database 436. The templates may correspond to different illumination conditions in which the image frames, from which the code was extracted, were captured.

Database 436 may store the iris code templates for a plurality of users. Database 436 may be managed centrally or locally. For example, a user may delete some of the iris code templates that were stored for the user in database 436 during previously completed enrollment sessions. He may also re-enroll and thus add new iris code templates to database 436 and associate them with the user's account. The user may also delete all the iris code templates associated with his account maintained by database 436, and start the enrollment process anew.

User Authentication Based on Iris Code

Generally, the process of authenticating a user, for whom one or more iris biometric templates have been stored in an enrollment database, follows steps 302-320 and 324 described in FIG. 3. However, the process may include some additional steps that for clarity of the description of FIG. 3 have not been described in FIG. 3. An embodiment of the process of authenticating a user based on the iris code is described in FIG. 5A-5B.

Capturing Digital Images in an Authentication Workflow

Figure 5A:
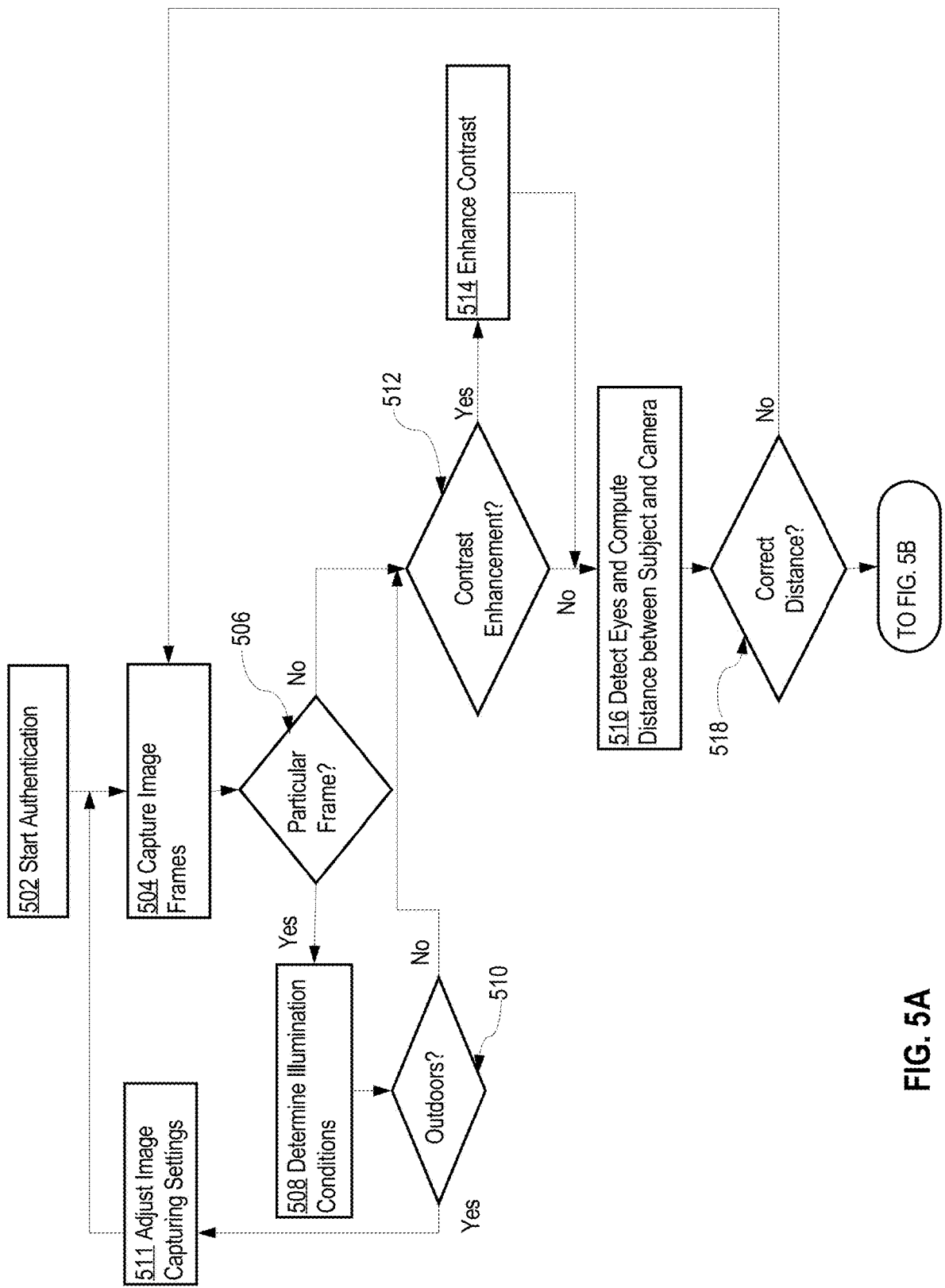
FIG. 5A is a block diagram depicting an example user authentication workflow based on iris code in accordance with one or more embodiments.

FIG. 5A is a block diagram depicting an example user authentication workflow based on iris code in accordance with one or more embodiments. In step 502, a process of authenticating a user based on iris biometric information starts. The process may be initiated by receiving input from a user that the user wishes to authenticate himself to a portable device and/or resources available via the portable device. The process may be initiated on any type of portable device, including a smartphone, a laptop, a tablet, and the like. For example, a user may press a start button on a smartphone, and in response to pressing the start button, the smartphone may generate a display on a display screen of the smartphone. The display may include instructions for initiating the authentication process.

In addition, the display may provide details about the process, and outline the process for the user. For example, the display may provide details and instructions for having pictures taken by the smartphone, and details and instructions for providing the user's identification data, and the like.

In step 504, one or more image frames are captured by the portable device. The frames may be captured using one or more image capturing devices, such as NIR cameras, or any other type of cameras.

In an embodiment, the portable device captures a plurality of image frames, and one or more first image frame are ignored in further processing. The reasons for ignoring/discarding the one or more first image frames are described in step 404 of FIG. 3A.

In step 506, a test is performed to determine whether a particular image frame has been captured. The particular image may be a second image, a third image, or any other image that has been chosen for a particular implementation of the iris-based authentication workflow.

If in step 506 it was determined that the particular image frame has been captured, then step 508 is performed. Otherwise, step 512 is performed.

Determining Illumination Condition in an Authentication Workflow

In step 508, one or more illumination conditions are determined for the second image frame. This step is similar to step 304 described in FIG. 3.

In an embodiment, illumination conditions determined for the particular image frame are analyzed to determine whether the frame was captured indoors or outdoors. While for the enrollment process the indoor images are preferred, the authentication process is usually designed in such a way that it can process both indoor and outdoor images.

In step 510, based on the outcome of the analysis of the illumination conditions for the particular image frame, a test is performed to determine whether the particular image frame was captured outdoors. If it is determined that the frame was captured outdoors, then step 511, one or more image capturing settings are adjusted. The image capturing settings may include an image sensor power and/or a LED power. This may also include extending or shortening the exposure time, and modifying other camera-specific parameters. Step 511 is similar to step 308 in FIG. 3.

In an embodiment, for the images that are being captured outdoors, the exposure settings on cameras installed in the portable device are adjusted by a fixed, pre-defined value. Once the exposure settings are adjusted, the adjusted settings are used by the camera to capture the subsequent image frames.

However, if in step 510, it is determined that the particular image frame was not captured outdoors, then step 512 is performed.

Enhancing Image Contrast in an Authentication Workflow

In step 512, a test is performed to determine whether a contrast enhancement option has been activated on the portable device. Performing contrast enhancement on an image is usually a time-consuming process, and therefore, it may be turned off by default. However, there might be a need to turn the contrast enhancement option on when for example, the particular image has a rather low contrast and/or quality, and thus images of the better quality are desired.

If the contrast enhancement option has been activated on the portable device, then in step 514, a contrast enhancement process is initiated and used to pre-process the particular image frame and/or additionally captured image frames. If the contrast enhancement option has not been activated on the portable device, then step 516 is performed.

In step 514, the particular image frame is pre-processed to enhance contrast characteristics of the particular image frame. Examples of various contrast enhancement approaches are described in step 312 of FIG. 3 and step 414 of FIG. 4A.

Detecting Eye Regions in an Image in an Authentication Workflow

In step 516, the particular image frame is processed to determine one or more regions in which an eye, or eyes are depicted. Determining the eye regions in the particular image frame may include applying programmable detectors and/or classifiers to the image. The detectors and classifiers may be designed to process content of the image, compare information about the content of the image with various templates, and determine whether the image depicts at least one eye.

In an embodiment, a test is performed to determine whether the particular image frame depicts two eyes. If the particular image frame depicts two eyes, then the information about the two eyes may be sufficient to calculate a distance between a user (a physical person) and a camera of the portable device. The distance may be calculated using any method known in the optics and trigonometrical arts. The distance between the user and the camera is also referred to as a subject distance.

Comparing a Subject Distance with a Threshold Range

In step 518, a subject distance is compared with a threshold range, and a test is performed to determine whether the subject distance is within the threshold range. If the subject distance exceeds the threshold range, then the user is probably too far from a camera of the portable device, and a depiction of the user in the second image frame may be too small to perform the authentication process. If the subject distance is below the threshold range, then the user is probably too close to the camera, and a depiction of the user in the second image frame may be too large to perform the authentication process.

In an embodiment, instead of a threshold range, a threshold upper bound, or a threshold lower bound is used. Examples of these thresholds are described in step 418 of FIG. 4A.

Any of the methods described above may be used to determine whether the subject distance is correct with respect to the camera location. If it is determined that the subject distance is correct, then the particular image frame is further processed as described in FIG. 5B. However, if in step 518 it is determined that the subject distance it incorrect, then step 504 is performed and additional images are captured.

Segmenting an Iris Region in an Image in an Authentication Workflow

Figure 5B:
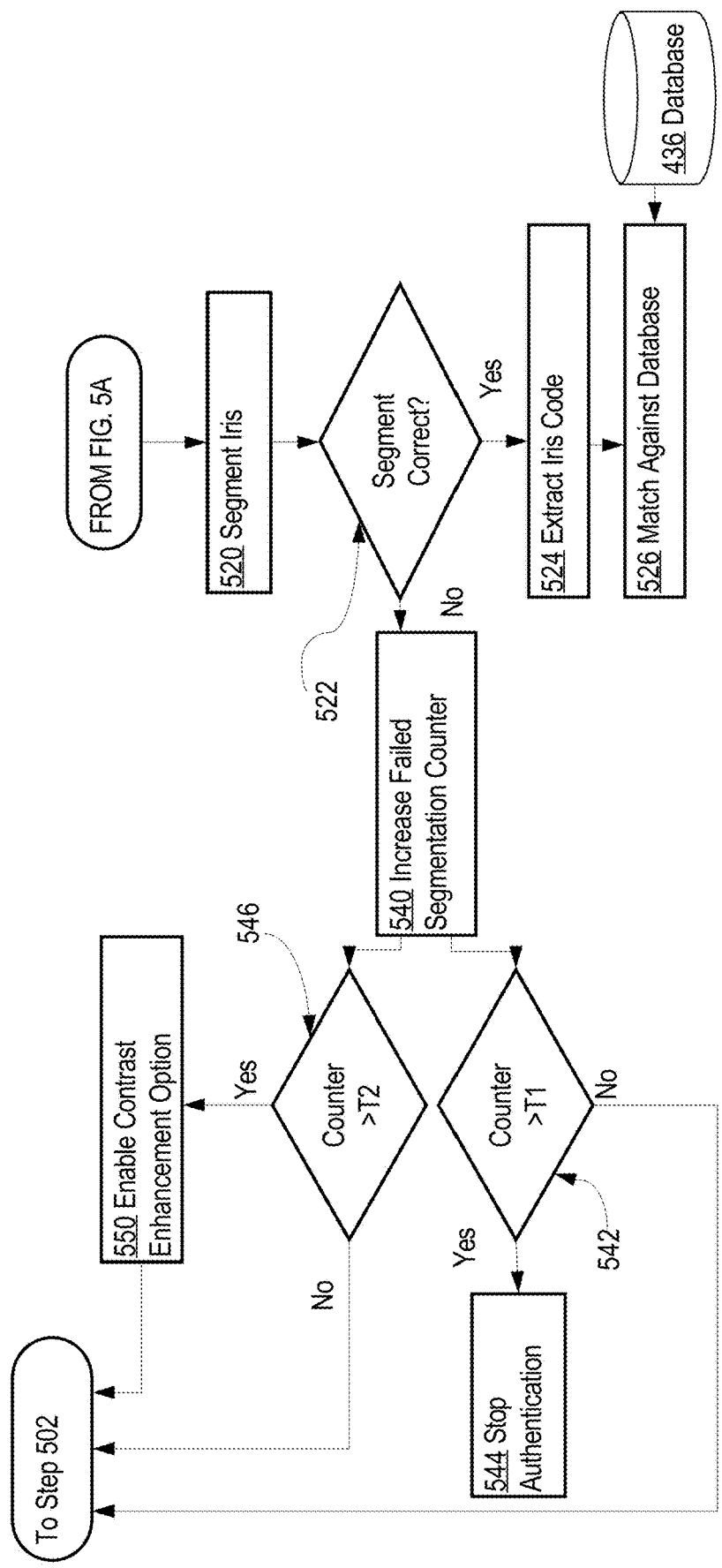
FIG. 5B is a block diagram depicting an example user authentication workflow based on iris code in accordance with one or more embodiments.

FIG. 5B is a block diagram depicting an example authentication workflow based on iris code in accordance with one or more embodiments. Steps described in FIG. 5B are executed once it is determined that a subject distance between a user and a camera used to capture images of the user is correct. The tests for determining whether the subject distance is correct are described in step 518 of FIG. 5A.

In step 520, the particular image frame is further processed to segment an iris region in the frame. Segmenting the iris region in the frame may include determining a spatial relationship between the iris and the eyelids neighboring the iris, and determining an iris region in which the iris is depicted, but which does not include the eyelashes or eyelids. Examples of iris segmentation approaches are described in step 420 of FIG. 4B.

In an embodiment, once an iris region is segmented, one or more ISO metrics are generated. The ISO metrics may be used to select the best frame to authenticate the user to the portable device.

In step 522, a test is performed to determine whether the segmentation of the iris region was successful. This step is similar to step 422 in FIG. 4B.

If the segmentation was successful, then step 524 is performed. Otherwise, step 540 is performed.

Using a Failed Segmentation Counter in an Authentication Workflow

In step 540, the failed segmentation counter value is increased because in step 522 it was determined that the segmentation of the iris region in the particular image frame has failed. In an embodiment, an output of the failed segmentation counter is communicated to both step 542 and step 546.

In step 542, a test is performed to determine whether to stop an authentication process. For example, if a value of the failed segmentation counter exceeds a first threshold, then the authentication process is terminated in step 544. The value associated with the first threshold may depend on the implementation of the authentication process. In an embodiment, the first threshold may be assigned a value from an empirically determined range.

In step 546, a test is performed to determine whether to enable a contrast enhancement option on the portable device. In an embodiment, a contrast enhancement option is implemented in firmware of the portable device. The contrast enhancement option implemented in the firmware allows performing the contrast enhancement faster than if other implementations of the contrast enhancement option are used.

The test performed in step 546 may use a second threshold. For example, if a value of the failed segmentation counter exceeds the second threshold, then this may indicate that the iris segmentations have been failing because the contrast of the image, or images, is insufficient for the proper segmentation of the iris region. The value associated with the second threshold may depend on the implementation of the enrollment process. In an embodiment, the second threshold may be assigned a value from an empirically determined range.

A first threshold and a second threshold may be predetermined in a variety of ways. For example, the first threshold, which is used to determine whether to terminate the authentication process, may exceed the second threshold, which is used to determine whether to activate a contrast enhancement option on the portable device. Examples of different settings for the first and second thresholds are described in steps 442-446 of FIG. 4B.

Extracting Iris Code from an Iris Region

In step 524, iris code is extracted from an iris region segmented from the particular image frame. The iris code may be extracted from the iris region in many ways.

Examples of different approaches for segmenting an iris code are described in step 318 of FIG. 3 and step 424 of FIG. 4B.

Authenticating a User Based on the User's Biometric Data

In step 526, a test is performed to determine whether the iris code extracted in step 524 from the particular image frame matches any of the iris code templates stored in iris code templates database 436. Iris code templates database 436 is described in FIG. 4B.

The test of step 526 may be performed in a variety of ways. For example, the extracted code may be compared to each and every iris code template stored in iris code templates database 436.

In an embodiment, iris code templates database 436 stores only one iris code template. This scenario is possible if a user of the portable device enrolled only one iris code template during his enrollment session. This may also occur when the user of the portable device deleted some of the iris code templates that were stored in database 436 for the user, leaving in database 436 only one iris code template. If only one iris code template is stored in iris code template database 436, then the comparison between the extracted iris code and the template stored in database 436 is rather straightforward. If the extracted iris code matches the template, then the user may be granted access to the portable device. That may be because the user's biometric information, represented in the extracted iris code, matches the iris code template stored for the user in database 436, and therefore, the user may access the resources of the portable device.

However, if the extracted iris code does not match the iris code template stored in database 436, then the user may be denied access to the portable device. That may be because the user's biometric information (the extracted iris code) does not match the template stored for the user in database 436, and therefore, the user may not access the resources of the portable device.

If access is denied, then a message may be displayed on a display device of the portable device to indicate that the user has been denied access to the portable device. In addition, an electronic message to a service provider indicating that access to the portable device has been denied because the authentication of the user has failed. The electronic message may also indicate that an attack on the portable device is in progress.

In an embodiment, iris code templates database 436 stores a plurality of iris code templates. This scenario is possible if a user of the portable device enrolled a plurality of iris code templates or if the portable device has more than one user. If there are two or more users of the portable device and each of them enrolled at least one iris code template to database 436, then database 436 may group the templates by user's identifiers. However, other organizations of contents of database 436 may also be implemented.

If a plurality of iris code templates is stored in iris code template database 436, then the iris code extracted from the particular image frame during the authentication session is compared with the iris code templates stored in database 436. If a match between the extracted iris code and a particular template stored in database 436 is found, then the user may be granted access to the portable device. That may be because the user's biometric information, represented in the extracted iris code, matches the particular iris code template stored for the user in database 436.

However, if none of the iris code templates stored in database 436 matches the extracted iris code, then the user may be denied access to the resources of the portable device.

In addition, an electronic message to a service provider indicating that access to the portable device has been denied because the authentication of the user has failed. The electronic message may also indicate that an attack on the portable device is in progress.

Iris Recognition System as a Functionality Enhancement Implemented in a Portable Device In an embodiment, the iris recognition system described herein is implemented in a portable device to enhance functionalities of the portable device. The presented approach enhances the functionalities of the portable device by configuring the portable device to generate, process and store iris-biometric templates for a user, and to provide the stored iris-biometric templates to a user authentication process. Furthermore, the presented approach enhances the functionalities of the portable device by configuring the portable device to authenticate a user to the portable device based on iris-biometric information received from the user and the iris-biometric templates previously stored for the user.

Example Implementation System

According to some embodiments, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
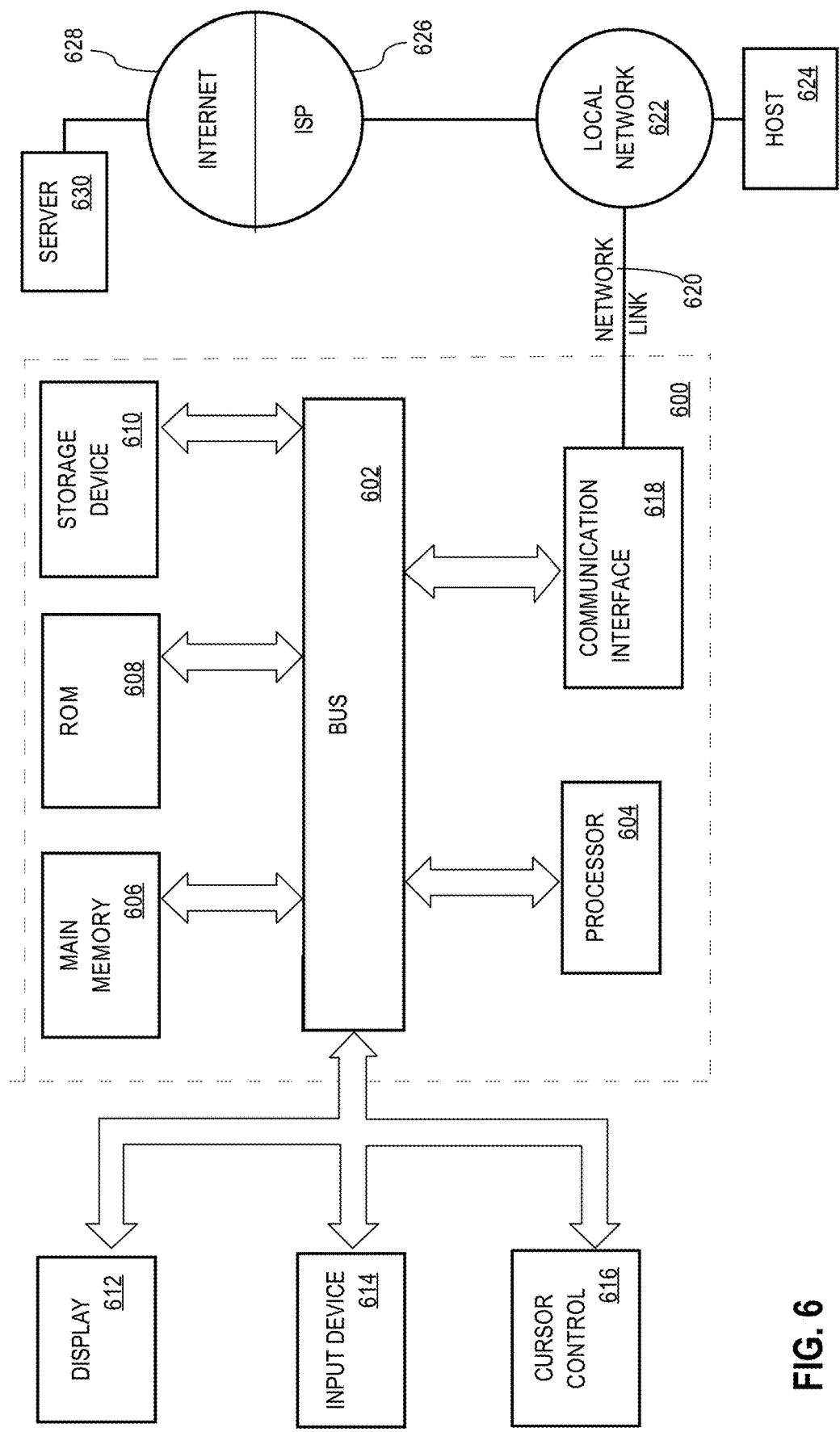
FIG. 6 illustrates a computer system upon which one or more embodiments may be implemented.

For example, FIG. 6 is a block diagram that depicts a computer system 600 upon which an embodiment may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   determining, by a portable device, image capturing conditions by analyzing contents of a first digital image captured by an image capturing device;
   determining, by the portable device, whether the image capturing conditions, determined for the first digital image, indicate indoor image capturing conditions;
   in response to determining that the image capturing conditions, determined for the first digital image, indicate indoor image capturing conditions:
      determining, by the portable device, whether the first digital image includes a depiction of at least one eye; and in response to determining that the first digital image
includes a depiction of at least one eye:
segmenting, in the first digital image, an iris region
depicting the at least one eye;
determining whether the iris region includes iris
valid information; and
in response to determining that the iris region does
not include iris valid information:
causing the image capturing device to capture a
second digital image having an enhanced contrast relative to a contrast of the first digital
image;
determining whether the second digital image
includes iris valid information; and
in response to determining that the second digital
image includes iris valid information, extracting an iris code from the second digital image;
and
in response to determining that the image capturing
conditions, determined for the first digital image, indicate outdoor image capturing conditions:
displaying a first indication that the first digital image
must be captured in the indoor image capturing
conditions for an iris code enrollment process; and
displaying a second indication of resumption of the iris
code enrollment process when the image capturing
conditions, determined for the first digital image,
indicate indoor image capturing conditions.

2. The method of claim 1, further comprising:
in response to determining that the first digital image
includes a depiction of two eyes:
identifying, in the first digital image, two iris regions
depicting the two eyes;
based on the two iris regions, computing a subject
distance that represents a distance between a user
and the portable device;
based on the subject distance, determining whether the
subject distance is acceptable for extracting at least
one iris code from the two iris regions; and
in response to determining that the subject distance is
not acceptable for extracting at least one iris code
from any of the two iris regions, performing a
contrast enhancement on the first digital image.

3. The method of claim 1, further comprising:
in response to determining that the second digital image
includes iris valid information:
determining whether an enrollment request is received,
the enrollment request requesting to use the iris code,
extracted from the second digital image, as an enrollment template; and
in response to determining that an enrollment request is
received:
generating a user identifier;
associating the user identifier with the iris code; and
storing the iris code as an iris template in association
with the user identifier in a storage device.

4. The method of claim 1, further comprising:
determining whether an authentication request is
received, the authentication request requesting to use
the iris code, extracted from the second digital image,
as an authentication attempt; and
in response to determining that the authentication request
is received:
retrieving an iris template from a storage device;
comparing the iris code, extracted from the second
digital image, with the iris template to determine
whether the iris code matches the iris template; and
in response to determining that the iris code matches
the iris template, granting access to the portable
device.

5. One or more non-transitory computer storage media
storing instructions which, when executed, by one or more
processors, cause the one or more processors to perform:
determining, by a portable device, image capturing conditions by analyzing contents of a first digital image
captured by an image capturing device;
determining, by the portable device, whether the image
capturing conditions, determined for the first digital
image, indicate indoor image capturing conditions;
in response to determining that the image capturing
conditions, determined for the first digital image, indicate indoor image capturing conditions;
determining, by the portable device, whether the first
digital image includes a depiction of at least one eye;
and
in response to determining that the first digital image
includes a depiction of at least one eye:
segmenting, in the first digital image, an iris region
depicting the at least one eye;
determining whether the iris region includes iris
valid information; and
in response to determining that the iris region does
not include iris valid information:
determining whether a counter, storing counts of
frames which did not include iris valid information, satisfies a criterion; and
in response to determining that the counter satisfies the criterion, determining whether to perform a contrast enhancement on the first digital
image; and
in response to determining that a contrast enhancement on the first digital image is to be performed on the first digital image, performing
the contrast enhancement on the first digital
image;
causing the image capturing device to capture a
second digital image having an enhanced contrast relative to a contrast of the first digital
image;
determining whether the second digital image
includes iris valid information; and
in response to determining that the second digital
image includes iris valid information, extracting an iris code from the second digital image.

6. The one or more non-transitory computer storage media
of claim 5, storing additional instructions which, when
executed by the one or more processors, cause the one or
more processors to perform:
in response to determining that the image capturing
conditions, determined for the first digital image, do not
indicate indoor image capturing conditions:
adjusting for an image capturing setting of the image
capturing device;
adjusting the image capturing setting of the image
capturing device based on the adjustment;
causing the image capturing device to capture a third
digital image;
determining whether an authentication request is
received; and
in response to determining that an authentication
request is received:
determining, based on the third digital image,
whether access to the portable device is to be
granted or denied.

7. The one or more non-transitory computer storage media of claim 5, storing additional instructions which, when executed by the one or more processors, cause the one or more processors to perform:
in response to determining that the first digital image includes a depiction of two eyes:
identifying, in the first digital image, two iris regions depicting the two eyes;
based on the two iris regions, computing a subject distance that represents a distance between a user and the portable device;
based on the subject distance, determining whether the subject distance is acceptable for extracting at least one iris code from the two iris regions;
in response to determining that the subject distance is acceptable for extracting at least one iris code from any of the two iris regions, extracting at least one iris code from at least one of the two iris regions; and
in response to determining that the subject distance is not acceptable for extracting at least one iris code from any of the two iris regions, performing a contrast enhancement on the first digital image.

8. The one or more non-transitory computer storage media of claim 5, storing additional instructions which, when executed by the one or more processors, cause the one or more processors to perform:
in response to determining that the second digital image includes iris valid information:
determining whether an enrollment request is received, the enrollment request requesting to use the iris code, extracted from the second digital image, as an enrollment template; and
in response to determining that an enrollment request is received:
generating a user identifier;
associating the user identifier with the iris code; and
storing the iris code as an iris template in association with the user identifier in a storage device.

9. The one or more non-transitory computer storage media of claim 5, storing additional instructions which, when executed by the one or more processors, cause the one or more processors to perform:
determining whether an authentication request is received, the authentication request requesting to use the iris code, extracted from the second digital image, as an authentication attempt;
in response to determining that the authentication request is received:
retrieving an iris template from a storage device;
comparing the iris code, extracted from the second digital image, with the iris template to determine whether the iris code matches the iris template;
in response to determining that the iris code matches the iris template, granting access to the portable device; and
in response to determining that the iris code does not match the iris template, denying access to the portable device.

10. The one or more non-transitory computer storage media of claim 5, wherein the image capturing conditions are weather-based conditions of a scene that was captured in the first digital image and the second digital image by the image capturing device;
wherein the image capturing conditions include at least one of: a condition with clouds, a condition with sun, a condition with a strong sun, a condition with rain, a condition with a sun rise, a condition with a sun sunset, a condition in a dark room, a condition in a bright room, a condition with a natural light, a condition with a fluorescent light, or a condition with a dimmed light.

11. The one or more non-transitory computer storage media of claim 5, storing additional instructions which, when executed by the one or more processors, cause the one or more processors to perform:
in response to determining that the first digital image does not include a depiction of at least one eye, selecting another digital image or causing the image capturing device to capture a third digital image.

12. A portable communication apparatus comprising:
a memory unit storing programmable instructions;
an image capturing device;
a hardware processor configured to execute the programmable instructions which, when executed by the hardware processor, cause the hardware processor to perform:
determining, by the portable communication apparatus, image capturing conditions by analyzing contents of a first digital image captured by an image capturing device;
determining whether the image capturing conditions, determined for the first digital image, indicate indoor image capturing conditions;
in response to determining that the image capturing conditions, determined for the first digital image, indicate indoor image capturing conditions:
determining whether the first digital image includes a depiction of at least one eye;
in response to determining that the first digital image includes a depiction of at least one eye:
segmenting, in the first digital image, an iris region depicting the at least one eye;
determining whether the iris region includes iris valid information; and
in response to determining that the iris region does not include iris valid information:
causing the image capturing device to capture a second digital image having an enhanced contrast relative to a contrast of the first digital image;
determining whether the second digital image includes iris valid information; and
in response to determining that the second digital image includes iris valid information;
determining whether an enrollment request is received, the enrollment request requesting to use an iris code, extracted from the second digital image, as an enrollment template; and
in response to determining that an enrollment request is received:
generating a user identifier;
associating the user identifier with the iris code; and
storing the iris code as an iris template in association with the user identifier in a storage device,
wherein generating the user identifier, associating the user identifier with the iris code, and storing the iris code as the iris template in association with the user identifier in the storage device includes:
extracting a plurality of iris codes extracted from different image capturing conditions;
enrolling the plurality of iris codes as a plurality of iris code templates associated with the user;
determining whether an authentication request to use the plurality of iris codes as an authentication attempt is received; and in response to determining that the authentication request to use the plurality of iris codes as an authentication attempt is received, retrieving a first one of the plurality of iris code templates from the storage device that matches a current image capturing condition.

13. The portable communication apparatus of claim 12, storing additional instructions which, when executed by the hardware processor, cause the hardware processor to perform:
   in response to determining that the image capturing conditions, determined for the first digital image, do not indicate indoor image capturing conditions:
      determining an adjustment for an image capturing setting of the image capturing device;
      adjusting the image capturing setting of the image capturing device based on the adjustment;
      causing the image capturing device to capture a third digital image;
      determining whether an authentication request is received; and
      in response to determining that an authentication request is received:
         determining, based on the third digital image, whether access to the portable communication apparatus is to be granted or denied.

14. The portable communication apparatus of claim 12, storing additional instructions which, when executed by the hardware processor, cause the hardware processor to perform:
   in response to determining that the first digital image includes a depiction of two eyes:
      identifying, in the first digital image, two iris regions depicting the two eyes;
      based on the two iris regions, computing a subject distance that represents a distance between a user and the portable communication apparatus;
      based on the subject distance, determining whether the subject distance is acceptable for extracting the iris code from the two iris regions;
      in response to determining that the subject distance is acceptable for extracting the iris code from any of the two iris regions, extracting the iris code from at least one of the two iris regions; and
      in response to determining that the subject distance is not acceptable for extracting the iris code from any of the two iris regions, performing a contrast enhancement on the first digital image.

15. The portable communication apparatus of claim 12, storing additional instructions which, when executed by the hardware processor, cause the hardware processor to perform:
   in response to determining that the second digital image includes iris valid information:
      determining whether an enrollment request is received, the enrollment request requesting to use the iris code, extracted from the second digital image, as an enrollment template; and
      in response to determining that an enrollment request is received:
         generating a user identifier;
         associating the user identifier with the iris code; and
         storing the iris code as an iris template in association with the user identifier in a storage device.

16. The method of claim 1, wherein causing the image capturing device to capture the second digital image having an enhanced contrast is implemented in firmware of the portable device to capture images including a relatively higher contrast than the contrast of the first digital image.

17. The method of claim 3, wherein generating the user identifier, associating the user identifier with the iris code, and storing the iris code as the iris template in association with the user identifier in the storage device further includes:
   extracting a plurality of iris codes extracted from different image capturing conditions;
   enrolling the plurality of iris codes as a plurality of iris code templates associated with the user;
   determining whether an authentication request to use the plurality of iris codes as an authentication attempt is received; and
   in response to determining that the authentication request to use the plurality of iris codes as an authentication attempt is received, retrieving a first one of the plurality of iris code templates from the storage device that matches a current image capturing condition.

* * * * *